United States Patent
Tomioka (10) Patent No.: US 7,142,339 B2
(45) Date of Patent: Nov. 28, 2006

(54) MULTI-BEAM OPTICAL SCANNING APPARATUS AND IMAGE FORMING APPARATUS USING THE SAME

(75) Inventor: Yuichi Tomioka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/974,703

(22) Filed: Oct. 28, 2004

(65) Prior Publication Data

US 2005/0094233 A1    May 5, 2005

(30) Foreign Application Priority Data

Nov. 4, 2003  (JP) ............................. 2003-374522

(51) Int. Cl.
*G02B 26/10* (2006.01)
(52) U.S. Cl. .................... 359/204; 359/206; 347/259
(58) Field of Classification Search ........ 359/196–226, 359/233–261
See application file for complete search history.

(56) References Cited

U.S. PATENT DOCUMENTS

| | | | | |
|---|---|---|---|---|
| 5,302,812 A | * | 4/1994 | Li et al. ................. | 235/462.22 |
| 5,930,019 A | * | 7/1999 | Suzuki et al. ............... | 359/204 |
| 5,943,153 A | * | 8/1999 | Naiki et al. ................. | 359/210 |
| 6,038,053 A | * | 3/2000 | Kato .......................... | 359/205 |
| 6,081,364 A | * | 6/2000 | Kimura ..................... | 359/204 |
| 6,157,478 A | * | 12/2000 | Naiki et al. ................. | 359/204 |
| 6,185,029 B1 | * | 2/2001 | Ishihara ...................... | 359/216 |
| 6,366,385 B1 | * | 4/2002 | Kimura ...................... | 359/204 |
| 6,396,615 B1 | * | 5/2002 | Hama et al. ................ | 359/204 |
| 6,507,427 B1 | * | 1/2003 | Yamawaki ................... | 359/210 |
| 6,775,041 B1 | * | 8/2004 | Nakajima .................... | 359/216 |
| 6,963,433 B1 | * | 11/2005 | Yamawaki .................. | 359/204 |

FOREIGN PATENT DOCUMENTS

| | | |
|---|---|---|
| JP | 3-107811 | 5/1991 |
| JP | 8-29714 | 2/1996 |
| JP | 2000-292721 | 10/2000 |
| JP | 2001-305448 | 10/2001 |

\* cited by examiner

*Primary Examiner*—Mark A. Robinson
(74) *Attorney, Agent, or Firm*—Fitzpatrick, Cella, Harper & Scinto (57) ABSTRACT

A multi-beam optical scanning apparatus includes a light source in which a plurality of light emitting regions are located at an interval in a main scanning direction, an incident optical system for allowing light beams emitted from the light source to enter a deflector with a state in which a width of the light beams is wider than that of a deflection surface of the deflector in the main scanning direction, and an imaging optical system for imaging the light beams which are reflected and deflected on the deflector on a surface to be scanned. The incident optical system includes a condensing optical system for changing a state of the light beams emitted from the light source. A back focal position of the condensing optical system in the main scanning direction is located on the deflection surface or in its vicinity. Provided are a multi-beam optical scanning apparatus capable of reducing an illuminance difference between the light beams at the same image height on the surface to be scanned to form an image having no unevenness in density, a high resolution, and a high quality; and an image forming apparatus using the device.

3 Claims, 8 Drawing Sheets

MULTI-BEAM OPTICAL SCANNING APPARATUS AND IMAGE FORMING APPARATUS USING THE SAME

BACKGROUND OF THE INVENTION

1. Field of the Invention

The present invention relates to a multi-beam optical scanning apparatus and an image forming apparatus using the same. More particularly, the present invention relates to an optical scanning device suitable for an image forming apparatus such as a laser beam printer, a digital copying machine, or a multi-function printer, which has, for example, an electrophotographic process and employs a structure in which a plurality of light beams emitted from a light source means having a plurality of light emission regions are deflected by a polygon mirror serving as an optical deflector and then a surface to be scanned is scanned with the light beams through an imaging optical system having an fθ characteristic to record image information.

2. Related Background Art

Up to now, in an optical scanning device, a light flux (light beam) which is optically modulated according to an image signal and emitted from a light source means is periodically deflected by an optical deflector composed of, for example, a polygon mirror. The light beam is condensed in a spot shape on the surface of a photosensitive recording medium by an imaging optical system having an fθ characteristic. The surface of a photosensitive recording medium is scanned with the light beam to record an image.

In recent years, with increase in speed and downsizing in an image forming apparatus as a laser beam printer, a digital copying machine, or a multi-function printer, it is desired to further increase a scanning speed of a scanning optical system used as an optical system and to make the scanning optical system more compact. In order to increase the scanning speed, for example, a multi-beam optical scanning apparatus is used.

Figure 9:
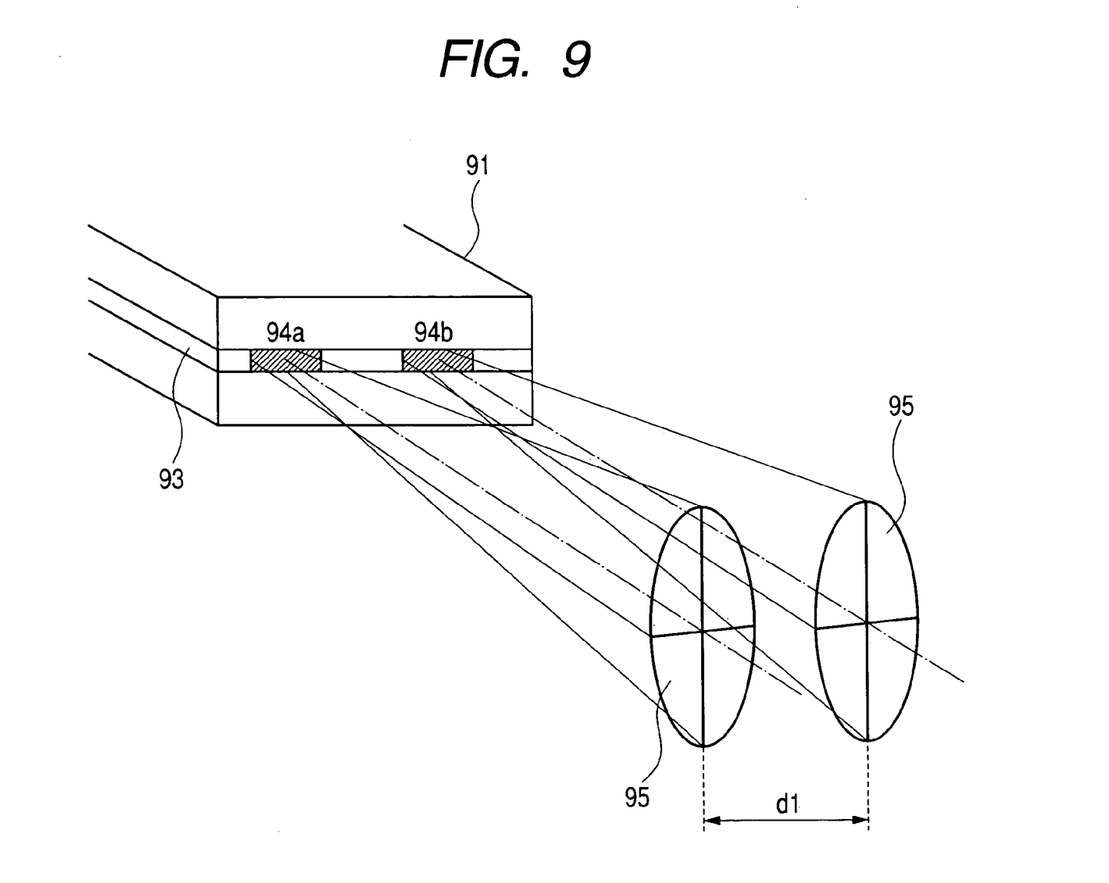
FIG. 9 is a principal part schematic view showing a monolithic multi-beam laser.

In the multi-beam optical scanning apparatus, a plurality of lines on a surface to be scanned are simultaneously scanned with a plurality of light beams emitted from a light source means having a plurality of light emitting regions (light emitting points), so that image information is recorded at high speed. Referring to FIG. 9, a multi-beam semiconductor laser will be described as an example of the light source means used for the multi-beam optical scanning apparatus.

FIG. 9 is a principal part schematic view showing a multi-beam semiconductor laser having two light emitting regions.

As shown in FIG. 9, a multi-beam semiconductor laser 91 has two light emitting regions 94a and 94b in an active layer 93. Deflection directions of divergent light beams emitted from the two light emitting regions 94a and 94b coincide with each other. Sectional shapes 95 of the divergent light beams are substantially identical to each other.

When two lines on a surface to be scanned are simultaneously scanned with the two light beams using the multi-beam semiconductor laser 91, an interval between the two lines can be adjusted by changing an interval between the two light emitting regions 94a and 94b of the multi-beam semiconductor laser 91 in a sub scanning direction. The interval between the two light emitting regions 94a and 94b is determined in advance. Therefore, the interval in the sub scanning direction is adjusted by rotating the multi-beam semiconductor laser 91 about an intermediate point between the two light emitting regions 94a and 94b as the rotational center.

An overfilled optical system (hereinafter referred to as "an OFS") is used as a means for further increasing the scanning speed. In the OFS, it is enough if a reflection surface of a rotating polygonal mirror has a width corresponding to a light beam width, of a wide width of an incident light beam, to substantially deflect a light beam for scanning. Therefore, it is possible to reduce a size of the rotating polygonal mirror and increase the number of surfaces thereof. Thus, the OFS is suitable for increasing the scanning speed.

However, in an image forming apparatus using the OFS, illuminance on the surface to be scanned becomes nonuniform because of features of the OFS. Therefore, there is a problem in that unevenness of a formed image in density occurs.

Hereinafter, a mechanism that the illuminance on the surface to be scanned becomes nonuniform will be described.

In the OFS, an incident light beam on a deflection means (rotating polygonal mirror) has a Gaussian distribution in which a light intensity becomes maximum near the optical axis of a condensing optical system. A reflection and deflection region is changed from the vicinity of the optical axis to peripheral portions according to a view angle. As a result, the illuminance on the surface to be scanned tends to reduce as an image height increases.

Further, in the OFS, a light beam width of a reflected and deflected light beam in a main scanning direction narrows as the view angle increases. Therefore, the tendency that the illuminance on the surface to be scanned reduces as the image height increases is further enhanced.

In particular, when an incident side F number (FNo.) in the main scanning direction is set to a small value, the light amount of peripheral part of the incident light beam on the deflection means significantly reduces. In the OFS, a different part of the incident light beam is reflected for optical scanning for each view angle, so that the nonuniformity of an illuminance distribution on the surface to be scanned is promoted.

Thus, in the OFS, in order to suppress the nonuniformity of an illuminance distribution, it is necessary to increase the incident side F number in the main scanning direction. As a result, the amount of taken light in the main scanning direction reduces. In order to ensure the required amount of light corresponding to the reduced light, the amount of taken light in the sub scanning direction needs to be increased. That is, it is necessary to set small the incident side F number in the sub scanning direction.

However, as described above, when the incident side F number in the main scanning direction is set large and the incident side F number in the sub scanning direction is set small, there arises a problem in that the size of the optical scanning device increases because an optical path length of an incident optical system is long.

Hereinafter, the reason why the optical path length of the incident optical system becomes long will be described with reference to FIGS. 10A and 10B.

Figure 10A:
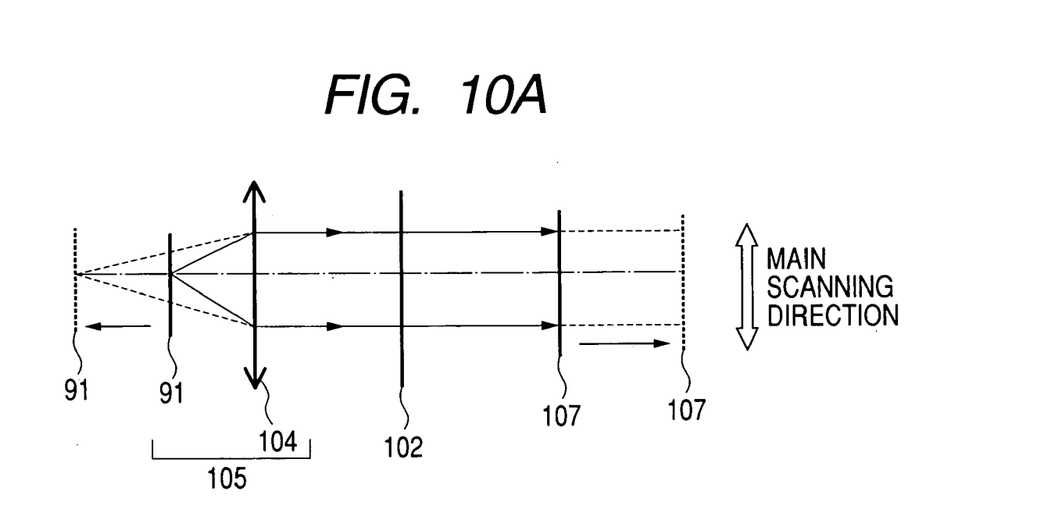
FIG. 10A is a principal part sectional view in a main scanning direction, showing a general incident optical system of an optical scanning device.
Figure 10B:
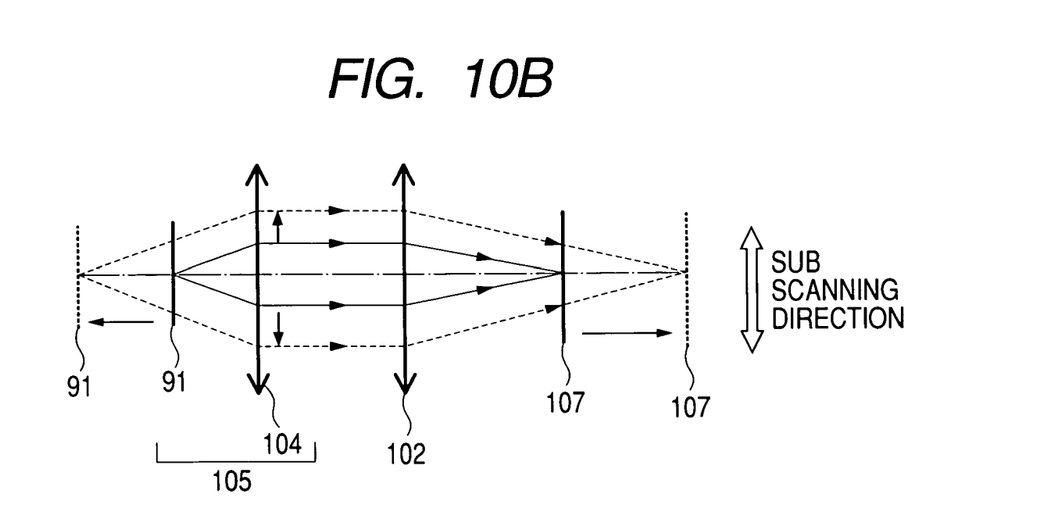
FIG. 10B is a principal part sectional view in a sub scanning direction, showing the general incident optical system of the optical scanning device.

FIGS. 10A and 10B are sectional views showing a principal part of general incident optical systems used for the optical scanning device. FIG. 10A is a sectional view showing the principal part in the main scanning direction (main scanning principal part sectional view). FIG. 10B is a sectional view showing the principal part in the sub scanning direction (sub scanning principal part sectional view).

In FIGS. 10A and 10B, an incident optical system 105 includes a light source means 91 and a collimator lens 104 (described later) which are integrally configured. As shown in FIGS. 10A and 10B, the collimator lens 104 for collimating a divergent light beam emitted from the light source means 91 and a sub scanning cylindrical lens 102 which is an anamorphic lens having refractive power mainly in the sub scanning direction are disposed in order from the light source means 91 side. Reference numeral 107 denotes a deflection surface.

In FIGS. 10A and 10B, a solid line indicates a light beam in the case where the incident side F number in the main scanning direction is set equal to the incident side F number in the sub scanning direction. On the contrary, a dot line indicates a light beam in the case where the incident side F number in the main scanning direction is set larger than the incident side F number in the sub scanning direction.

As is apparent from FIGS. 10A and 10B, it is necessary to lengthen an interval between the light source means 91 and the collimator lens 104 in order to obtain a desirable light beam width in the main scanning direction in accordance with the incident side F number in the main scanning direction being set large. In accordance with this, it is necessary to lengthen an interval between the sub scanning cylindrical lens 102 and the deflection surface 107. As a result, when the incident side F number in the main scanning direction is set large and the incident side F number in the sub scanning direction is set small, there arises a problem in that the optical path length of the incident optical system 105 becomes long.

In order to solve such a problem, various devices such as a multi-beam optical scanning apparatus and an optical scanning device have been proposed (for example, see Japanese Patent Application Laid-Open No. 2000-292721 and Japanese Patent Application Laid-Open No. 2001-305448).

According to Japanese Patent Application Laid-Open No. 2000-292721, a light beam enlarging optical system for enlarging a size of an incident light beam is provided on an optical path between a light source means and a deflection means. The size of the incident light beam is enlarged in at least the main scanning direction. According to Japanese Patent Application Laid-Open 2001-305448, a cylindrical lens and a collimator lens, which compose an incident optical system, are disposed in order from the light source means side, so that an optical path necessary for both is doubled to significantly shorten an optical path length.

However, in a method described in Japanese Patent Application Laid-Open No. 2000-292721, since an illuminance difference is caused between two beams at the same image height, unevenness of a formed image in density tends to occur.

Hereinafter, a mechanism to cause the illuminance difference between the two beams at the same image height in Japanese Patent Application Laid-Open No. 2000-292721 will be described with reference to FIG. 11.

Figure 11:
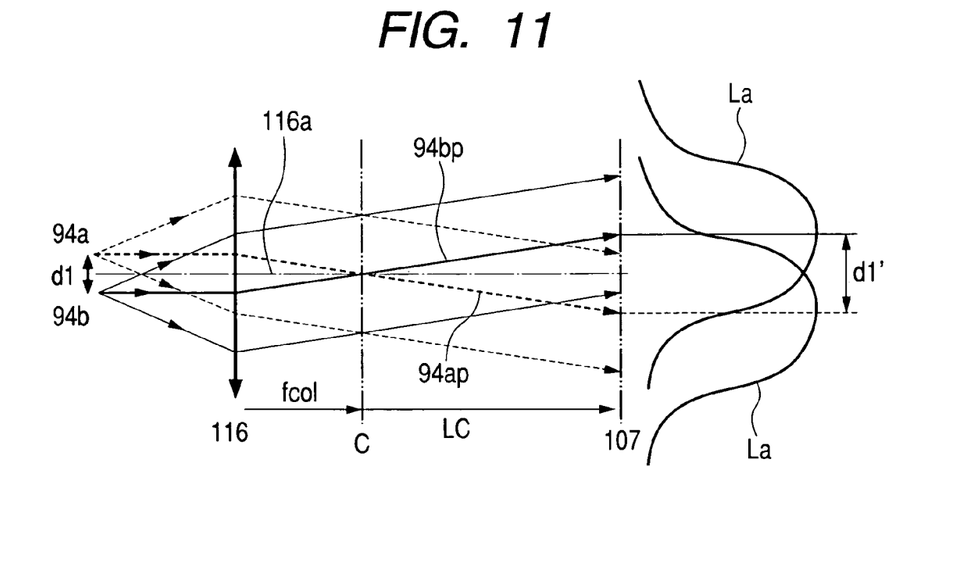
FIG. 11 is a principal part sectional view in the main scanning direction, showing an incident optical system of a conventional multi-OFS.

FIG. 11 is a principal part sectional view in the main scanning direction (main scanning sectional view), showing a multi-beam optical scanning apparatus using an OFS described in FIG. 4 in Japanese Patent Application Laid-Open No. 2000-292721. In FIG. 11, an incident optical system is shown as a single condensing optical system 116. Reference numeral 107 denotes the deflection surface.

As shown in FIG. 11, divergent light beams emitted from the two light emitting regions 94a and 94b having an interval d1 in the main scanning direction therebetween are incident on the condensing optical system 116 and exit as parallel light beams. Assume that an intensity central light beam (located at a central position of an intensity distribution in which an intensity thereof is maximum) 94ap of the light beam emitted from the light emitting region 94a and an intensity central light beam 94bp of the light beam emitted from the light emitting region 94b are parallel to an optical axis of the condensing optical system 116.

Since the intensity central light beams 94ap and 94bp each are deviated from an optical axis 116a of the condensing optical system 116 in the main scanning direction and incident on the condensing optical system 116. Then, the intensity central light beams 94ap and 94bp are exited at an angle relative to the optical axis 116a of the condensing optical system 116 in the main scanning direction. Therefore, an interval d1' between the intensity central light beams 94ap and 94bp of the light beams emitted from the two light emitting regions 94a and 94b on the deflection surface 107 is changed according to a distance LC between a back focal position C of the condensing optical system 116 in the main scanning direction and the deflection surface 107. The interval d1' can be expressed by $$d1' = LC \times d1 / fcol \quad (1)$$

where fcol represents the focal length of the condensing optical system 116.

According to Japanese Patent Application Laid-Open No. 2000-292721, since the distance LC between the back focal position C of the condensing optical system 116 in the main scanning direction and the deflection surface 107 is long, as is apparent from the expression (1), the interval d1' on the deflection surface 107, between the intensity central light beam 94ap of the light beam emitted from the light emitting region 94a and the intensity central light beam 94bp of the light beam emitted from the light emitting region 94b becomes not smaller than a given value.

As a result, since the two light beams incident on the deflection surface 107 have intensity distributions La, which are nonuniform in the main scanning direction and different from each other, illuminance distributions of the two light beams at an image height on the surface to be scanned are different from each other. Such a state is shown in FIG. 12.

Figure 12:
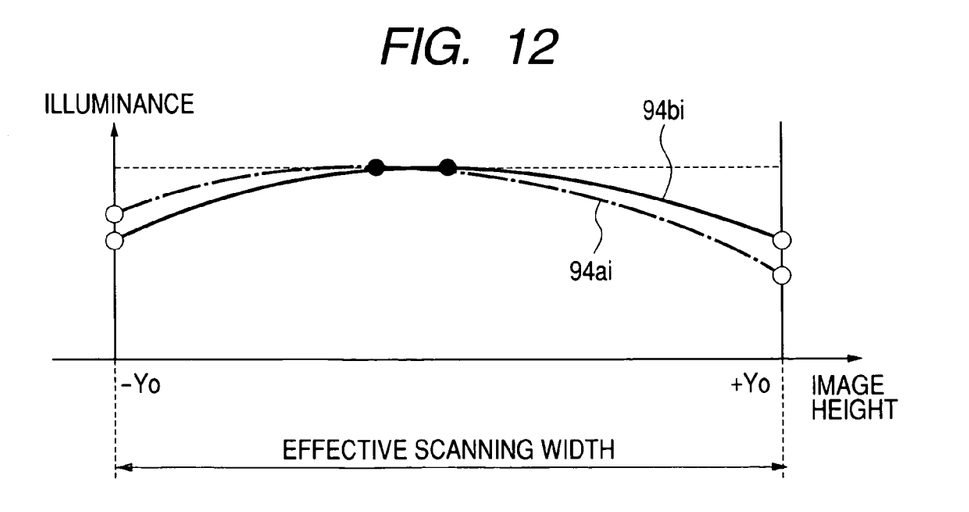
FIG. 12 is a graph showing a conventional illuminance distribution on the surface to be scanned.

FIG. 12 shows illuminance distributions 94ai and 94bi of the respective light beams emitted from the two light emitting regions 94a and 94b on the surface to be scanned. As is apparent from FIG. 12, the illuminance difference is caused between two beams at the same image height on the surface to be scanned. The unevenness of a formed image in density tends to occur in Japanese Patent Application Laid-Open No. 2000-292721.

Even in the case of Japanese Patent Application Laid-Open No. 2001-305448, when the multi-beam optical scanning apparatus having the OFS is used to further increase the scanning speed, an illuminance difference is caused between a plurality of beams at the same image height on the surface to be scanned because a back focal position of the condensing optical system in the main scanning direction and a deflection surface are apart from each other.

SUMMARY OF THE INVENTION

An object of the present invention is to provide a multi-beam optical scanning apparatus capable of reducing an illuminance difference between a plurality of beams at the same image height on a surface to be scanned to form an image having no unevenness in density, a high resolution, and a high quality, and an image forming apparatus using the multi-beam optical scanning apparatus.

According to one aspect of the invention, a multi-beam optical scanning apparatus includes a plurality of light emitting regions disposed at least at an interval in a main scanning direction; an incident optical system for allowing the plurality of light beams emitted from the plurality of light emitting regions to enter deflection means with a state in which a width of each of the plurality of light beams is wider than a width of a deflection surface of the deflection means in the main scanning direction; and a scanning optical system for imaging the plurality of light beams, which are reflected and deflected on the deflection means on a surface to be scanned, wherein the incident optical system comprises a condensing optical system for changing a state of the plurality of light beams emitted from the plurality of light emitting regions, and a back focal position of the condensing optical system in the main scanning direction is located on the deflection surface of the deflection means or in a vicinity of the deflection surface.

In further aspect of the invention, in the multi-beam optical scanning apparatus, an incident side F number of the incident optical system in the main scanning direction is larger than an incident side F number thereof in a sub scanning direction.

In further aspect of the invention, in the multi-beam optical scanning apparatus, the incident optical system comprises at least one anamorphic optical element which is disposed between the plurality of light emitting regions and the condensing optical system and has refractive power in a sub scanning direction.

In further aspect of the invention, the multi-beam optical scanning apparatus includes: first adjusting means for adjusting a position of an image plane in the main scanning direction by moving the condensing optical system in an optical axis direction; and second adjusting means for adjusting a position of the image plane in the sub scanning direction by moving a unit integrally including elements from the plurality of light emitting regions to the condensing optical system in the optical axis direction.

In further aspect of the invention in the multi-beam optical scanning apparatus, a conditional expression, $$|LC/fcol|<0.2$$

is satisfied, where LC represents a distance between the back focal position of the condensing optical system in the main scanning direction and the deflection surface of the deflection means and fcol represents a focal length of the condensing optical system.

In further aspect of the invention in the multi-beam optical scanning apparatus, a conditional expression, $$0.15<Fs/Fm<0.4,$$

is satisfied, where Fm represents an incident F number of the incident optical system in the main scanning direction and Fs represents an incident F number thereof in a sub scanning direction.

According to another aspect of the invention, an image forming apparatus includes: the multi-beam optical scanning apparatus set out in the foregoing; a photosensitive member which is disposed on the surface to be scanned; a developing device for developing, as a toner image, an electrostatic latent image which is formed on the photosensitive member scanned with light beams by the multi-beam optical scanning apparatus; a transferring device for transferring the developed toner image to a material to be transferred; and a fixing device for fixing the transferred toner image to the material to be transferred.

According to another aspect of the invention, an image forming apparatus includes: a multi-beam optical scanning apparatus set out in the foregoing; and a printer controller for converting code data inputted from an external device into an image signal and outputs the image signal to the multi-beam optical scanning apparatus.

According to another aspect of the invention, a color image forming apparatus includes a plurality of image bearing members each of which is disposed on a surface to be scanned of a multi-beam optical scanning apparatus set out in the foregoing and the plurality of image bearing members form different color images from each other.

In further aspect of the invention, the color image forming apparatus includes a printer controller for converting a color signal inputted from an external device into different color image data and outputting the different color image data to each of the optical scanning devices.

According to the present invention, by configuring so that the back focal position of the condensing optical system in the main scanning direction in the multi-beam optical scanning apparatus having an OFS is positioned to the deflection surface, the illuminance difference between the plurality of beams at the same image height on the surface to be scanned can be reduced. Thus, it is possible to achieve a multi-beam optical scanning apparatus capable of obtaining a high resolution and high quality image at high speed and an image forming apparatus using the multi-beam optical scanning apparatus.

DETAILED DESCRIPTION OF THE

PREFERRED EMBODIMENTS

Hereinafter, embodiments of the present invention will be described with reference to the accompanying drawings.

(Embodiment 1)

Figure 1:
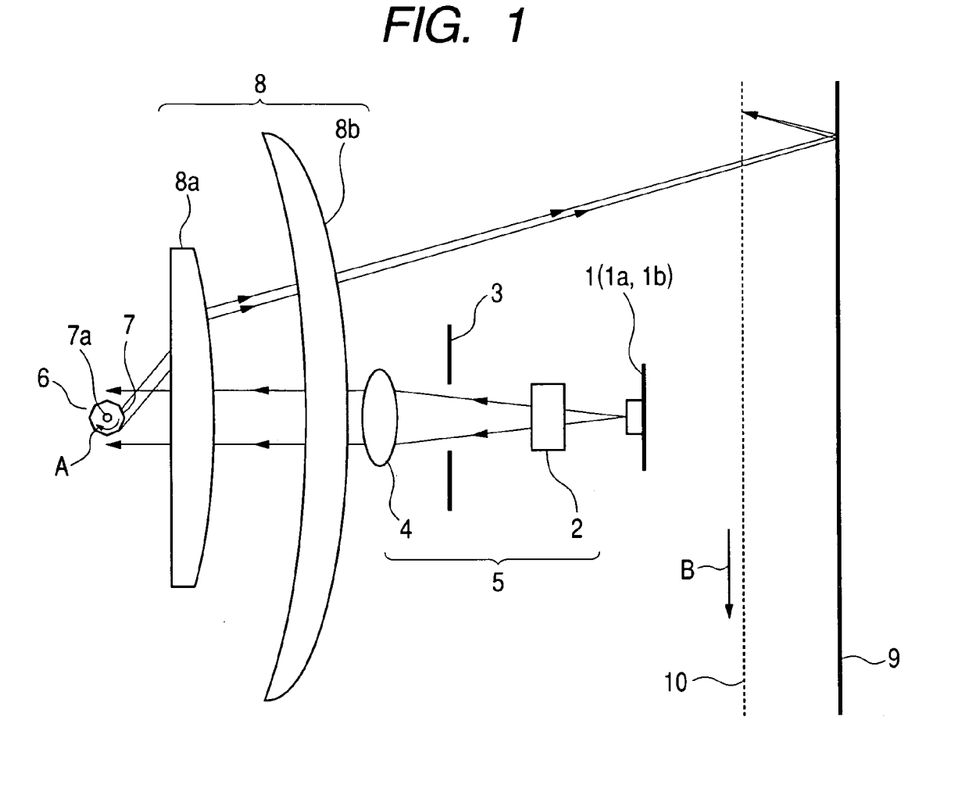
FIG. 1 is a main scanning sectional view in Embodiment 1 of the present invention.
Figure 2:
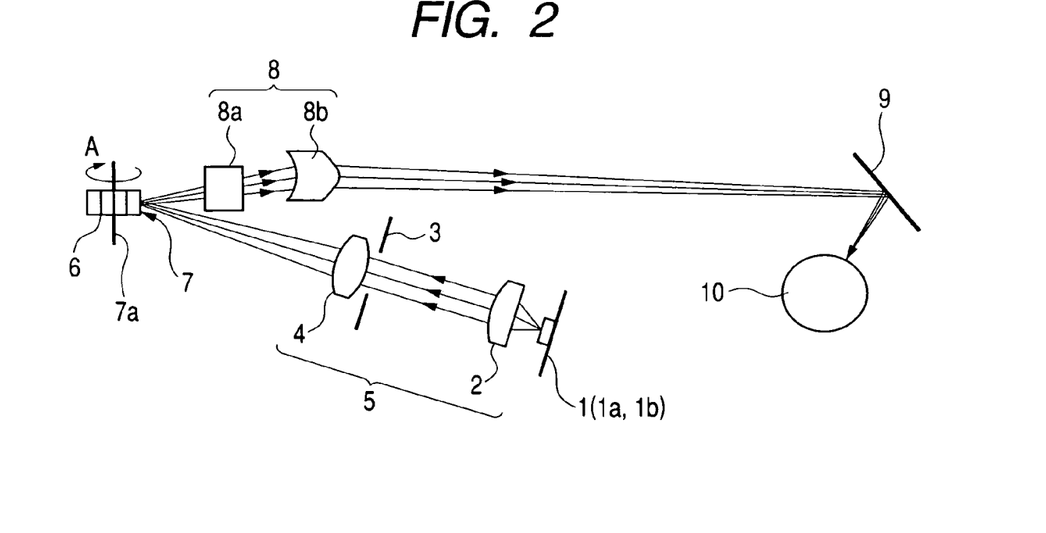
FIG. 2 is a sub scanning sectional view in Embodiment 1 of the present invention.

FIG. 1 is a principal part sectional view showing a multi-beam optical scanning apparatus using an OFS in the main scanning direction, according to Embodiment 1 of the present invention (main scanning sectional view). FIG. 2 is a principal part sectional view showing the multi-beam optical scanning apparatus shown in FIG. 1 in the sub scanning direction (sub scanning sectional view).

Here, the main scanning direction indicates a direction perpendicular to the rotational axis of a deflection means and the optical axis of a scanning optical element (traveling direction of a light beam which is reflected and deflected (deflected for scanning) by the deflection means). The sub scanning direction indicates a direction parallel to the rotational axis of the deflection means. In addition, the main scanning section indicates a plane which is parallel to the main scanning direction and includes the optical axis of an imaging optical system. The sub scanning section indicates a section perpendicular to the main scanning section.

In FIGS. 1 and 2, a light source means 1 is composed of a monolithic multi-beam laser having two light emitting points (laser tips) 1a and 1b. The two light emitting points 1a and 1b are arranged at a predetermined interval in the main scanning direction. In this embodiment, the number of light emitting points is two, however, three or more light emitting points may be used.

An anamorphic lens 2 serving as an anamorphic optical element (sub scanning cylindrical lens) has predetermined optical power (refractive power) mainly in the sub scanning direction. The anamorphic lens 2 converts two divergent light beams emitted from the multi-beam laser 1 into substantially parallel light beams in the sub scanning direction.

An aperture stop 3 adjusts the substantially parallel light beams exiting the sub scanning cylindrical lens 2 to a predetermined suitable beam shape.

A collimator lens 4 serving as a condensing optical system has predetermined optical power in the main scanning direction. The collimator lens 4 converts the divergent light beams emitted from the light source means 1 into substantially parallel light beams, convergent light beams, or divergent light beams in the main scanning direction. The collimator lens 4 collimates the divergent light beams emitted from the light source means 1 in the main scanning direction, and forms images of the light beams exiting the sub scanning cylindrical lens 2 as linear images extended in the main scanning direction on a deflection surface 7 of an optical deflector 6 described later.

In this embodiment, the back focal position of the collimator lens 4 in the main scanning direction is located on the deflection surface 7 (or in its vicinity).

The sub scanning cylindrical lens 2, the aperture stop 3, and the collimator lens 4 are all components of an incident optical system 5. In this embodiment, the sub scanning cylindrical lens 2, the aperture stop 3, and the collimator lens 4 are disposed in order from the light source means 1 side.

The optical deflector 6 serving as the deflection means is composed of, for example, a polygon mirror (rotating polygonal mirror). The optical deflector 6 is rotated in a direction indicated by an arrow "A" in FIGS. 1 and 2 at a constant rate by a drive means such as a motor (not shown).

An imaging optical system (scanning optical system) 8 having an fθ characteristic includes an fθ lens 8a and a long toric lens 8b. The fθ lens 8a has positive optical power only in the main scanning direction. The toric lens 8b has predetermined optical power only in the sub scanning direction. The imaging optical system 8 has a tangle error correcting function. To realize the tangle error correcting function, the two light beams based on image information, which are deflected and reflected on the optical deflector 6 are imaged on a photosensitive drum surface 10 serving as a surface to be scanned within the main scanning section, and a substantial conjugate relationship is optically made between the deflection surface 7 of the optical deflector 6 and the photosensitive drum surface 10 within the sub scanning section.

Reference numeral 9 denotes a return mirror serving as a reflection member, and reference numeral 10 denotes the photosensitive drum surface (recording medium surface) serving as the surface to be scanned.

In this embodiment, a plurality of light beams, which are optically modulated based on image information and emitted from the monolithic multi-beam laser 1, are refracted by the sub scanning cylindrical lens 2 having an optical power (refractive power) only in the sub scanning direction, so that the light beams are converted into divergent light beams in the main scanning direction and parallel light beams in the sub scanning direction. The plurality of light beams emitted from the sub scanning cylindrical lens 2 pass through the aperture stop 3 (part of the light beams is blocked) and are incident on the collimator lens 4. The plurality of light beams having passed through the collimator lens 4 are incident on the deflection surface 7 of the optical deflector 6 with a state in which a width of the light beams is wider than the width of the deflection surface 7 in the main scanning direction (so-called overfilled optical system (OFS)). The images of the plurality of light beams are formed as linear images extended in the main scanning direction on the deflection surface 7.

The plurality of light beams emitted from the collimator lens 4 enter the optical deflector 6 from the front thereof in the main scanning direction (from substantially the center of a scanning area along the front of the optical deflector 6 in the main scanning direction, that is, from substantially the center of the scanning area along the main scanning direction). In addition, the plurality of light beams enter the optical deflector 6 from an oblique lower side in the sub scanning direction.

Then, a part of the light beams which is reflected and deflected on the deflection surface 7 of the optical deflector 6 is guided onto the photosensitive drum surface 10 through the imaging optical system 8. The photosensitive drum surface 10 is optically scanned in a direction indicated by an arrow B (main scanning direction) by rotating the optical deflector 6 in the direction indicated by the arrow A, thereby recording the image information.

In this embodiment, the collimator lens 4 is set such that the back focal point C thereof in the main scanning direction is located on the deflection surface 7 (or in its vicinity), thereby eliminating a displacement in central position of the intensity distribution (interval between the light beams) on the deflection surface 7 when an intensity center line (see FIG. 11) of each of the light beams emitted from the two light emitting regions 1a and 1b is parallel to the optical axis of the collimator lens 4, so as to cancel the illuminance difference caused between the plurality of beams at the same image height on the surface to be scanned 10.

Thus, in an actual monolithic multi-beam laser in which the intensity center line of each of the light beams emitted from the two light emitting regions 1a and 1b is tilted with a deviation relative to the optical axis of the collimator lens 4, the illuminance difference caused between the plurality of beams can be reduced.

In this embodiment, the back focal position of the collimator lens 4 in the main scanning direction is made to coincide with the deflection surface 7. However, the present invention is not limited to this. The back focal position may be located in the vicinity of the deflection surface. That is, let LC represent a distance between the back focal position C of the collimator lens 4 in the main scanning direction and the deflection surface 7 and let fcol represent a focal length of the collimator lens 4 (see FIG. 11), the distance LC and the focal length fcol may be set so as to satisfy the following expression, $$|LC/fcol|<0.2 \quad (2)$$

When the conditional expression (2) is satisfied, the displacement in central position of the intensity distribution (interval between the light beams) on the deflection surface 7 becomes sufficiently smaller than the width of the deflection surface in the main scanning direction. Therefore, an effect enough to reduce the illuminance difference between the plurality of beams can be expected.

Here, when the back focal position C is located on the collimator lens 4 side relative to the deflection surface 7, a sign of the distance LC is assumed to be positive. When the back focal position C is located on a rotational axis 7a side relative to the deflection surface 7, the sign of the distance LC is assumed to be negative.

Figure 3:
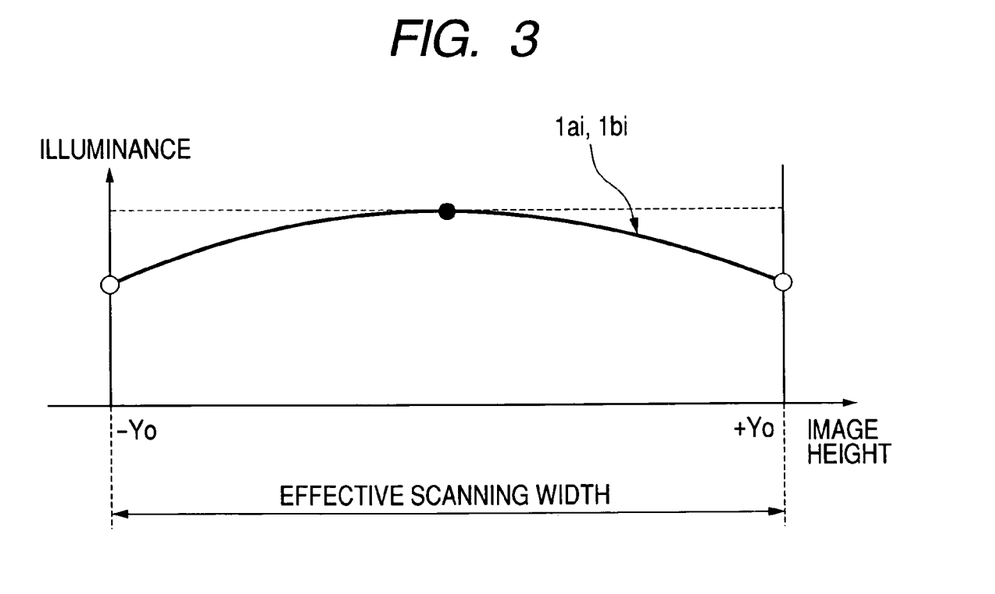
FIG. 3 is a graph showing an illuminance distribution on a surface to be scanned in Embodiment 1 of the present invention.

FIG. 3 is a distribution graph showing an illuminance distribution on the surface to be scanned 10 in the case where the intensity center line of each of the light beams emitted from the two light emitting regions 1a and 1b is parallel to the optical axis of the collimator lens 4 in this embodiment.

As shown in FIG. 3, respective illuminance distributions 1ai and 1bi of the light beams emitted from the two light emitting regions 1a and 1b coincide with each other at each image height within an effective scanning width. Thus, unevenness in density resulting from the illuminance difference between the plurality of beams is suppressed in this embodiment.

In this embodiment, an incident side F number (Fm) of the incident optical system 5 in the main scanning direction is set larger than an incident side F number (Fs) in the sub scanning direction. Therefore, the unevenness of the illuminance distribution on the surface to be scanned 10 is reduced. Here, the incident side F number in the main scanning direction Fm is set to 14 and the incident side F number in the sub scanning direction Fs is set to 4.

In this embodiment, the F number of the incident optical system 5 is preferably set so as to satisfy $$0.15<Fs/Fm<0.4 \quad (3)$$

In this embodiment, the sub scanning cylindrical lens 2 and the collimator lens 4 which compose the incident optical system 5 are disposed in order from the light source means 1 side, so that optical paths necessary for both are overlapped to shorten an optical path length.

In general, the adjustment of a position of an image plane on the surface to be scanned is performed by adjusting the position of the image plane in the main scanning direction by moving the collimator 4 in an optical axis direction, and then adjusting the position of the image plane in the sub scanning direction by moving the sub scanning cylindrical lens 2 in the optical axis direction.

However, when the incident side F number in the sub scanning direction Fs is set small such as 4 as in this embodiment, the sensitivity that the position of the image plane on the surface to be scanned in relation to the movement of the sub scanning cylindrical lens 2 in the optical axis direction is 240 times. It is too high. As a result, it becomes hard to adjust the position of the image plane in the sub scanning direction by moving the sub scanning cylindrical lens 2 in the optical axis direction.

Figure 4:
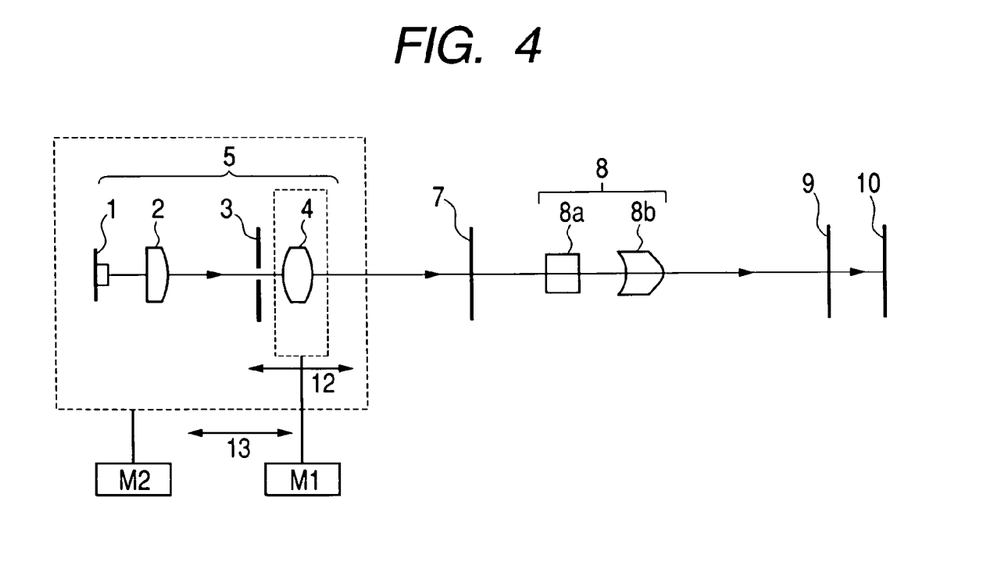
FIG. 4 is a sub scanning sectional view showing a method of adjusting a position of an image plane in Embodiment 1 of the present invention.

FIG. 4 is a sub scanning sectional view showing a method of adjusting the position of the image plane on the surface to be scanned in this embodiment. In FIG. 4, the same reference symbols are provided for the same elements as those shown in FIG. 1.

In this embodiment, the collimator lens 4 is moved in the optical axis direction by a first adjusting means M1 composed of a motor and the like to adjust the position of the image plane in the main scanning direction. After that, a unit 12 in which the light source means 1, the sub scanning cylindrical lens 2, the aperture stop 3, and the collimator lens 4 are integrally disposed is moved in the optical axis direction by a second adjusting means M2 composed of a motor and the like to adjust the position of the image plane in the sub scanning direction. In this time, the sensitivity that the position of the image plane on the surface to be scanned 10 in the main scanning direction in relation to the movement of the collimator lens 4 in the optical axis direction can be reduced to 4.6 times and the sensitivity of the position of the image plane on the surface to be scanned 10 in the sub scanning direction in relation to the movement of the entire incident optical system 5 in the optical axis direction can be reduced to 4 times. Thus, even when the incident side F number in the sub scanning direction (Fs) is set to the small value as in this embodiment, it is possible to adjust the position of the image plane on the surface to be scanned 10 at the same sensitivity as that in a conventional case.

Table 1 shows specific examples of specifications of the respective members in Embodiment 1 of the present invention.

TABLE 1

| Specifications in Embodiment 1 | | | |
|---|---|---|---|
| Laser Power | E | 5 | (mW) |
| The Number of Light Emitting Points | N | 2 | — |
| Interval between Light Emitting Points | $d_1$ | 90 | (μm) |
| Used Wavelength | λ | 790 | (nm) |
| Incident Side F Number in Main Scanning Direction | Fm | 14 | — |
| Incident Side F Number in Sub Scanning Direction | $F_s$ | 4 | — |
| Distance between Light Source and First Surface of Sub Scanning Cylindrical Lens | $L_1$ | 6.30 | (mm) |
| Curvature Radius of First Surface of Sub Scanning Cylindrical Lens | $Rcyl_1$ | ∞ | (mm) |
| Thickness of Sub Scanning Cylindrical Lens | dcyl | 5.00 | (mm) |
| Refractive Index of Glass Member of Sub Scanning Cylindrical Lens | n cyl | 1.76203 | — |
| Curvature Radius of Second Surface of Sub Scanning Cylindrical Lens | $Rcyl_2$ | −9.14 | (mm) |
| Focal Length of Sub Scanning Cylindrical Lens | fs | 9.14 | (mm) |
| Distance between Second Surface of Sub Scanning Cylindrical Lens and First Surface of Collimator Lens | $L_2$ | 59.96 | (mm) |
| Curvature Radius of First Surface of Collimator Lens | $Rcol_1$ | 71.44 | (mm) |
| Thickness of Collimator Lens | dcol | 5.00 | (mm) |
| Refractive Index of Glass Member of Collimator Lens | $n_1$ | 1.51072 | — |

TABLE 1-continued

Specifications in Embodiment 1

| | | | |
|---|---|---|---|
| Curvature Radius of Second Surface of Collimator Lens | Rcol$_2$ | −71.4 | (mm) |
| Focal Length of Collimator Lens | Fcol | 70.8 | (mm) |
| Second Surface to Deflection Surface of Collimator Lens | L$_3$ | 69.1 | (mm) |
| Entire Length of Incident Optical System | Lo | 145.37 | (mm) |
| Width of Deflection Surface in Main Scanning Direction | W | 2.85 | (mm) |
| Width of Main Scanning Effective Light Beam | Wo | 5.06 | (mm) |
| Diameter of Circumcircle of Polygon | Φ$_1$ | 7.45 | (mm) |
| Diameter of Inscribed Circle of Polygon | Φ$_2$ | 6.88 | (mm) |
| The Number of Deflection and Reflection Surfaces | M | 8 | (Surface) |
| Scanning Efficiency | Du | 90 | (%) |
| Maximal Scanning Angle | ±α | 40.5 | (deg) |
| Sub Scanning Magnification of Imaging Optical System | βs | 2 | (Times) |
| Effective Scanning Width | 2Yo | 214 | (mm) |
| Main Scanning Spot Diameter | ρm | 60 | (μm) |
| Sub Scanning Spot Diameter | ρm | 70 | (μm) |

(Embodiment 2)

Figure 5:
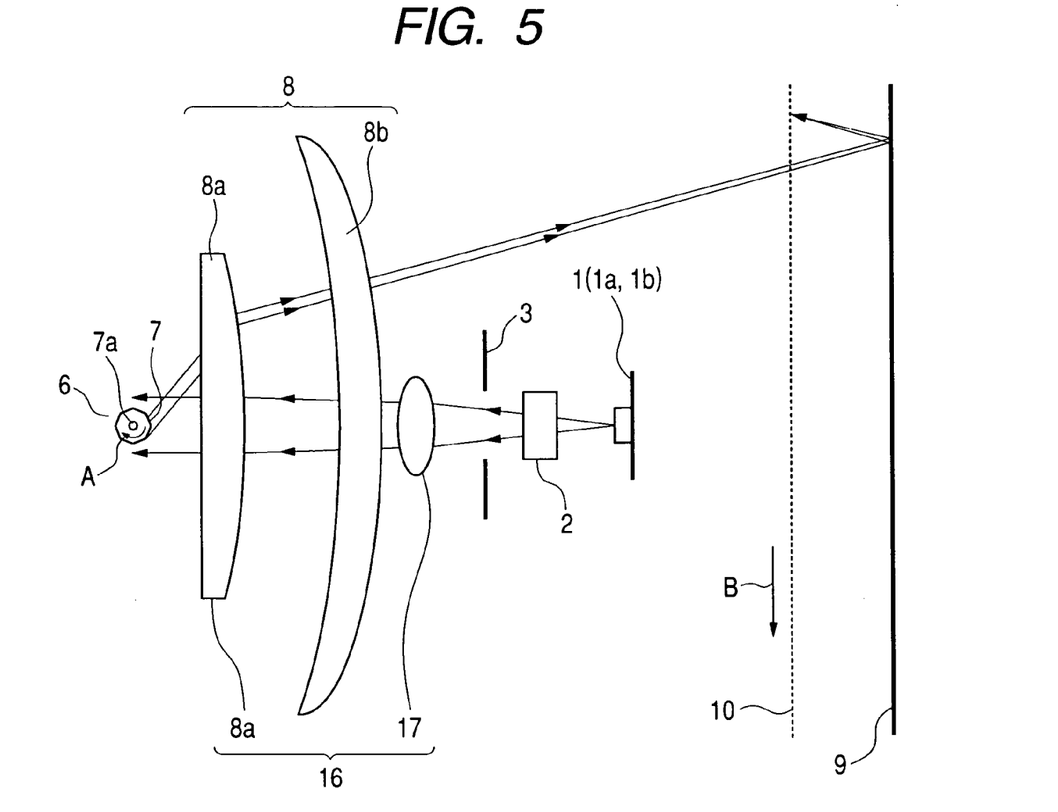
FIG. 5 is a main scanning sectional view in Embodiment 2 of the present invention.
Figure 6:
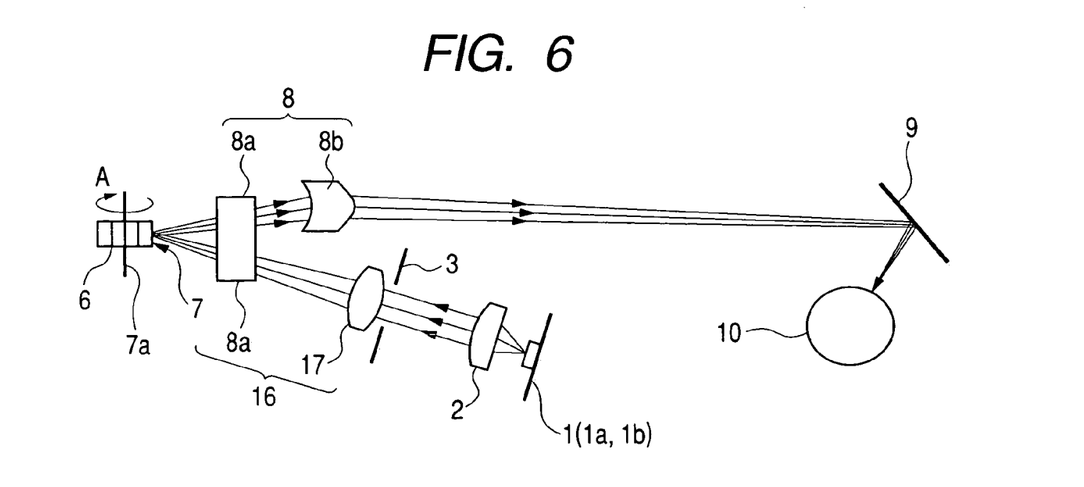
FIG. 6 is a sub scanning sectional view in Embodiment 2 of the present invention.

FIG. 5 is a principal part sectional view showing a multi-beam optical scanning apparatus using an OFS in the main scanning direction, according to Embodiment 2 of the present invention (main scanning sectional view). FIG. 6 is a principal part sectional view showing the multi-beam optical scanning apparatus shown in FIG. 5 in the sub scanning direction (sub scanning sectional view). In FIGS. 5 and 6, the same reference symbols are provided for the same elements as shown in FIGS. 1 and 2.

This embodiment is different from Embodiment 1 as described above in that a condensing optical system 16 is composed of two lenses, that is, a sphere lens 17 having an optical power in the main scanning direction and in the sub scanning direction and the fθ lens 8a composing the imaging optical system 8. The other structures and the other optical actions are substantially identical to those in Embodiment 1, so that the same effect can be obtained.

In FIGS. 5 and 6, the condensing optical system 16 includes two lenses, that is, the sphere lens 17 having an optical power in the main scanning direction and in the sub scanning direction and the fθ lens 8a. As in Embodiment 1 described above, the back focal position of the condensing optical system 16 in the main scanning direction is located on the deflection surface 7 of the optical deflector 6 or in the vicinity of the deflection surface 7.

In this embodiment, the condensing optical system is composed of the two lenses. However, the present invention is not limited thereto. The condensing optical system may be composed of three or more lenses.

In the respective embodiments, the anamorphic optical element having optical power mainly in the sub scanning direction is composed of a sub scanning cylindrical lens 2. However, the present invention is not limited thereto. The anamorphic optical element may be composed of two or more lenses. Therefore, wave aberration and field curvature can be further suppressed to form an image with higher resolution.

In the respective embodiments, the monolithic multi-beam laser having the plurality of light emitting regions is used as the light source means 1. However, the present invention is not limited to this. For example, a plurality of light sources (semiconductor lasers) may be used and light beams emitted from the plurality of light sources may be synthesized by a means such as a beam synthesizing prism.

The number of multi-beams is not limited to two. Three or more beams may be used. According to the present invention, a problem becomes significant as the number of multi-beams increases.

The reason for this is as follows. A maximal light emitting point interval between the plurality of light emitting regions in the case of three or more light emitting regions located at intervals in at least the main scanning direction becomes longer than that in the case of the two light emitting regions. Therefore, the illuminance difference between the plurality of beams at the same image height on the surface to be scanned increases.

(Image Forming Apparatus)

Figure 7:
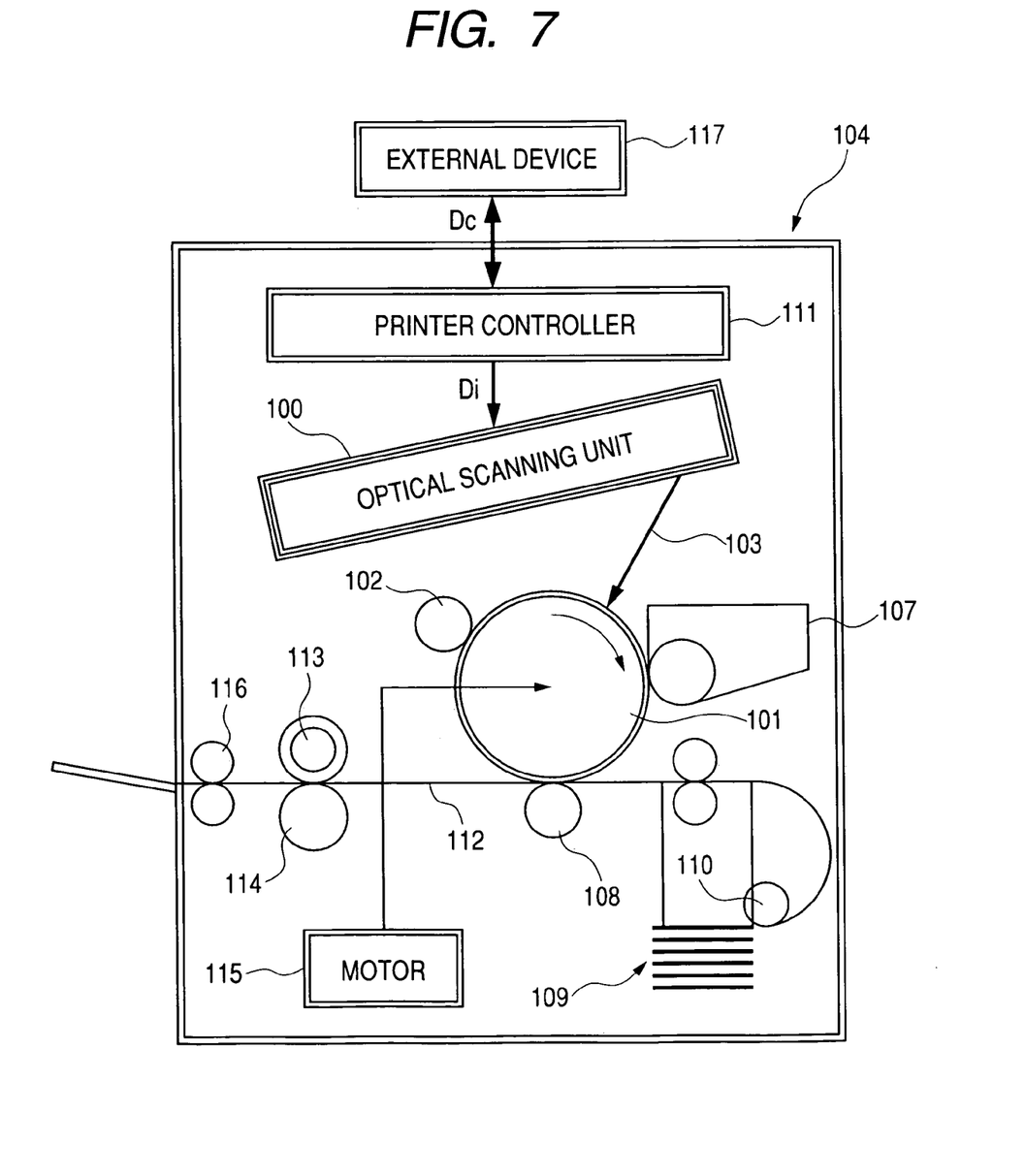
FIG. 7 is a sub scanning sectional view showing an image forming apparatus according to an embodiment of the present invention.

FIG. 7 is a principal part sectional view in the sub scanning direction, showing an image forming apparatus according to an embodiment of the present invention. In FIG. 7, reference numeral 104 denotes an image forming apparatus. Code data Dc is inputted from an external device 117 such as a personal computer to the image forming apparatus 104. The code data Dc is converted into image data (dot data) Di by a printer controller 111 in the image forming apparatus. The image data Di is inputted to an optical scanning unit (multi-beam optical scanning apparatus) 100 having the structure according to Embodiment 1 or 2. A light beam 103 modulated based on the image data Di is emitted from the optical scanning unit 100. A photosensitive surface of a photosensitive drum 101 is scanned with the light beam 103 in the main scanning direction.

The photosensitive drum 101 serving as an electrostatic latent image bearing member (photosensitive member) is rotated clockwise by a motor 115. According to the rotation, the photosensitive surface of the photosensitive drum 101 is moved relative to the light beam 103 in the sub scanning direction orthogonal to the main scanning direction. A charging roller 102 for uniformly charging the surface of the photosensitive drum 101 is provided above the photosensitive drum 101 so as to be in contact with the surface thereof. The surface of the photosensitive drum 101 which is charged by the charging roller 102 is irradiated with the light beam 103 scanned by the optical scanning unit 100.

As described above, the light beam 103 is modulated based on the image data Di. The surface of the photosensitive drum 101 is irradiated with the light beam 103 to form an electrostatic latent image thereon. The electrostatic latent image is developed as a toner image by a developing device 107, which is provided in the downstream side in the rotational direction of the photosensitive drum 101 from the irradiation position of the light beam 103 so as to be in contact with the photosensitive drum 101.

The toner image developed by the developing device 107 is transferred onto a sheet 112 serving as a material to be transferred by a transfer roller 108, which is provided below the photosensitive drum 101 so as to oppose to the photosensitive drum 101. The sheet 112 is contained in a sheet cassette 109 located in front (right side in FIG. 7) of the photosensitive drum 101. Manual feed can be also possible. A paper feed roller 110 is provided in the end portion of the sheet cassette 109. The sheet 112 in the sheet cassette 109 is sent to a transport path by the paper feed roller 110.

By the above operation, the sheet 112 to which an unfixed toner image is transferred is further transported to a fixing device located in the rear (left side in FIG. 7) of the photosensitive drum 101. The fixing device is composed of a fixing roller 113 having a fixing heater (not shown) therein and a pressure roller 114 provided so as to press the fixing roller 113. The sheet 112 transported from the transferring part is heated while it is pressurized in the press-contacting part between the fixing roller 113 and the pressure roller 114, so that the unfixed toner image on the sheet 112 is fixed. Further, a delivery roller 116 is provided in the rear of the fixing roller 113. The fixed sheet 112 is delivered to the outside of the image forming apparatus by the delivery roller 116.

Although not shown in FIG. 7, the printer controller 111 conducts not only data conversion described earlier but also control of each part of the image forming apparatus, which is represented by the motor 115, control of a polygon motor in the optical scanning unit as described later, and the like.

(Color Image Forming Apparatus)

Figure 8:
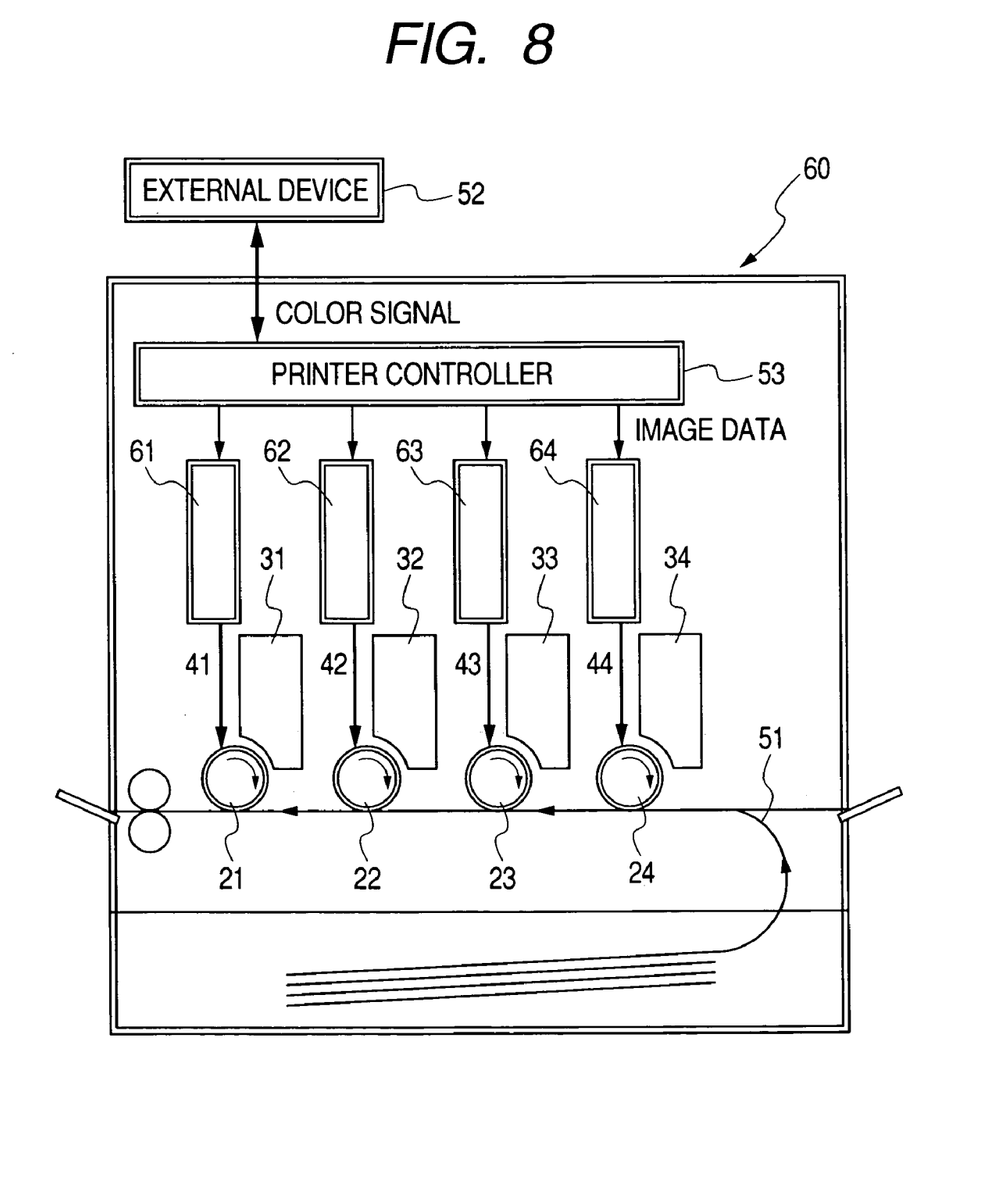
FIG. 8 is a principal part schematic view showing a color image forming apparatus according to an embodiment of the present invention.

FIG. 8 is a principal part schematic diagram showing a color image forming apparatus according to an embodiment of the present invention. This is a tandem type color image forming apparatus in which four optical scanning devices are arranged to record image information in parallel on the surface of the photosensitive drum serving as the image bearing member. In FIG. 8, reference numeral 60 denotes a color image forming apparatus. Reference numerals 61, 62, 63, and 64 each denote the optical scanning device (multi-beam optical scanning apparatus) having the structure described in Embodiment 1 or 2. Reference numerals 21, 22, 23, and 24 each denote a photosensitive drum serving as an image bearing member. Reference numerals 31, 32, 33, and 34 each denote a developing unit. Reference numeral 51 denotes a transport belt.

In FIG. 8, respective color signals of R (red), G (green), and B (blue) are inputted from an external device 52 such as a personal computer to the color image forming apparatus 60. The color signals are converted into respective image data (dot data) of C (cyan), M (magenta), Y (yellow), and B (black) by a printer controller 53 in the color image forming apparatus. These image data are inputted to the optical scanning devices 61, 62, 63, and 64, respectively. Light beams (plural beams) 41, 42, 43, and 44 modulated based on the respective image data are emitted from the optical scanning devices. The photosensitive surfaces of the photosensitive drums 21, 22, 23, and 24 are scanned with the light beams in the main scanning direction.

According to the color image forming apparatus in this embodiment, the four optical scanning devices (61, 62, 63, and 64) are arranged corresponding to the respective colors of C (cyan), M (magenta), Y (yellow), and B (black). The image signals (image information) are recorded in parallel on the surfaces of the photosensitive drums 21, 22, 23, and 24, thereby printing a color image at high speed.

According to the color image forming apparatus in this embodiment, as described above, the latent images of the respective colors are formed on the corresponding surfaces of the photosensitive drums 21, 22, 23, and 24 using the light beams based on the respective image data by the four scanning optical devices 61, 62, 63, and 64. After that, the multi-transfer is performed on a recording member to produce a full color image.

For example, a color image reading apparatus including a CCD sensor may be used as the external device 52. In this case, the color image reading apparatus and the color image forming apparatus 60 compose a color digital copying machine.

This application claims priority from Japanese Patent Application No. 2003-374522 filed Nov. 4, 2003, which is hereby incorporated by reference herein.

What is claimed is:

1. A method of adjusting a position of an image plane of an optical scanning apparatus, the optical scanning apparatus comprising light source means, deflecting means, an incident optical system for guiding a light beam emitted from a light emitting portion of the light source means to a deflecting surface of the deflecting means and an imaging optical system for imaging the light beam deflected on the deflecting surface of the deflecting means on a surface to be scanned, wherein the incident optical system includes a first optical element having refractive power in main and sub-scanning directions in an optical path between the light source means and the deflecting means and a second optical element having refractive power only in the sub-scanning direction, an incident side F-number of the incident optical system in the sub-scanning direction is smaller than that in the main scanning direction, and wherein a position of an image plane in the main scanning direction is adjusted by moving the first optical element in an optical axis direction of the incident optical system, and then a position of the image plane in the sub-scanning direction is adjusted by integrally moving the light source means, the first optical element and the second optical element in the optical axis direction of the incident optical system.

2. A method of adjusting a position of an image plane of an optical scanning apparatus according to claim 1, wherein the second optical element is disposed in an optical path between the light source means and the first optical element.

3. A method of adjusting a position of an image plane of an optical scanning apparatus according to claim 1, wherein the following conditional expression is satisfied, $$0.15 < Fs/Fm < 0.4$$

where Fm represents the incident side F-number in the main scanning direction of the incident optical system and Fs represents the incident side F-number in the sub-scanning direction of the incident optical system.

* * * * *